(12) United States Patent
Baby et al.

(10) Patent No.: US 9,899,041 B1
(45) Date of Patent: Feb. 20, 2018

(54) METHOD OF MAKING A WRITE POLE

(71) Applicant: Seagate Technology LLC, Cupertino, CA (US)

(72) Inventors: Aji Baby, Londonderry (GB); Marcus B. Mooney, Quigley's Point (IE); Mark A. Gubbins, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/094,637

(22) Filed: Apr. 8, 2016

Related U.S. Application Data

(60) Provisional application No. 62/152,150, filed on Apr. 24, 2015.

(51) Int. Cl.
*G11B 5/127* (2006.01)
*H04R 31/00* (2006.01)
*G11B 5/31* (2006.01)

(52) U.S. Cl.
CPC .......... *G11B 5/3116* (2013.01); *G11B 5/3169* (2013.01)

(58) Field of Classification Search
CPC ...... G11B 5/3116; G11B 5/3169; H04R 31/00
See application file for complete search history.

(56) References Cited

U.S. PATENT DOCUMENTS

| 4,278,493 | A | 7/1981 | Petvai |
| 7,503,107 | B2 | 3/2009 | Koyama et al. |
| 7,558,019 | B2 * | 7/2009 | Le ............... G11B 5/11 360/125.06 |
| 8,108,986 | B2 | 2/2012 | Liu |
| 8,171,618 | B1 | 5/2012 | Wang et al. |
| 8,259,411 | B2 | 9/2012 | Yang et al. |
| 8,323,727 | B2 | 12/2012 | Pentek et al. |
| 2006/0221497 | A1 * | 10/2006 | Okada ............ G11B 5/1278 360/125.12 |

* cited by examiner

*Primary Examiner* — Paul D Kim
(74) *Attorney, Agent, or Firm* — Hall Estill Attorneys at Law

(57) ABSTRACT

A write pole of a data writer may have at least one rotational milling operation conducted on a write pole blank followed by first and second static milling operations executed at different first and second angles with respect to an air bearing surface. The combination of rotational and static milling operations can form a write pole with body and tip regions defined by a continuous pole sidewall extending perpendicularly from the air bearing surface up to a body taper portion angled at approximately 14.5° with respect to the air bearing surface.

19 Claims, 3 Drawing Sheets

METHOD OF MAKING A WRITE POLE

RELATED APPLICATION

The present application makes a claim of domestic priority under 35 U.S.C. § 119(e) to U.S. Provisional Application No. 62/152,150 filed Apr. 24, 2015, the contents of which are incorporated by reference.

SUMMARY

A write pole of a data writer is constructed, in some embodiments, with at least one rotational milling operation conducted on a write pole blank followed by first and second static milling operations executed at different first and second angles with respect to an air bearing surface. The write pole has body and tip regions each defined by a continuous pole sidewall extending perpendicularly from the air bearing surface up to a body taper portion angled at approximately 14.5° with respect to the air bearing surface.

DETAILED DESCRIPTION

As computing devices become more sophisticated, greater amounts of data are being generated, transferred, and stored, which emphasizes the data storage capacity of data storage devices. To accommodate increasing data storage capacity demands by consumers and industry, the magnetic and physical footprint of computing components, such as a data writer and data reader, shrink. However, reductive scaling of a write pole portion of a data writer, for example, can diminish the effective magnetic field output of the data wrier along with the ability of the write pole to write data to a data storage medium with acceptable overwrite and bit error rate performance metrics. Hence, it is an industry and consumer goal to shrink the physical and magnetic footprint of at least a write pole portion of a data writer while maintaining acceptable performance metrics.

Accordingly, a write pole can be constructed with a combination of rotational and static angle milling operations that form a continuous pole sidewall that defines write pole body and write pole tip regions with the tip perpendicularly extending from an air bearing surface up to a body taper region angled with respect to the air bearing surface at approximately 14.5°. The use of static angle milling after one or more rotational milling operations can utilize shadowing effects to create a pole sidewall having a 0° tip portion and a relatively shallow body taper portion, such as 12-16°, with respect to the air bearing surface. The combination of tuned body taper angle with the 0° tip portion behind the air bearing surface allows the write pole to physically fatten at at distance of approximately 100 nm behind the air bearing surface, which increases the magnetic area of the write pole without compromising data writing performance.

Figure 1:
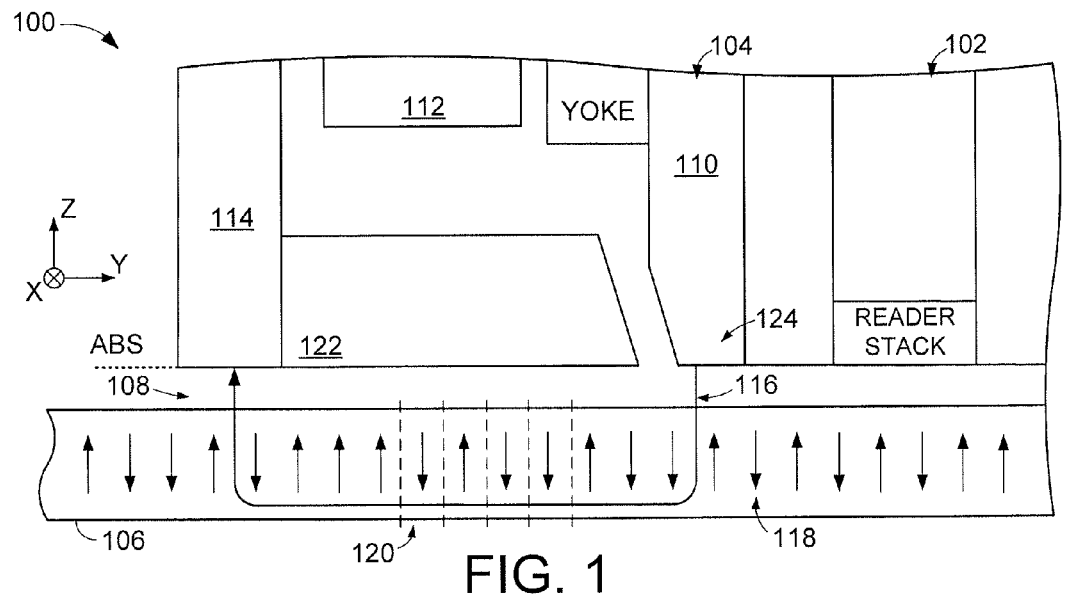
FIG. 1 is a line representation of an example data storage system arranged in accordance with various embodiments.

Although not required or limiting, a write pole constructed in accordance with various embodiments can be employed in the example data storage system 100 shown in FIG. 1. The data storage system 100 can have at least one data reader 102 and data writer 104 that are physically adjacent on a common head gimbal assembly (HGA) separated from a data storage medium 106 by an air bearing 108. The data writer 104 can have a write pole 110 and return pole 112 positioned on an air bearing surface (ABS) and configured to direct magnetic flux from a coil 114 to form a magnetic circuit 116 to write a selected magnetic polarity to one or more data bits 118 and data tracks 120.

At least one magnetic shield 122 is positioned between the writer poles 110 and 112 to aid in establishing and maintaining the magnetic circuit 114 passing through the data storage medium 106. As shown, the write pole 110 has a pole tip 124 that tapers to a smaller width along the X axis at the ABS. The pole tip 124 can funnel magnetic flux and reduce the magnetic footprint of the data writer 104 on the data storage medium 106, which can decrease the risk of inadvertent data erasure, such as adjacent track interference (ATI) and on-track overwriting conditions. Scaling down the physical size of the write pole 110 can increase the magnetic resolution of the data writer 104, but also can decrease the effective magnetic field at the ABS. While it is noted that shaping the write pole tip 124 can mitigate any effective magnetic field losses, precise shaping of nanometer scale write poles can be difficult and time consuming with conventional fabrication means.

Figure 2:
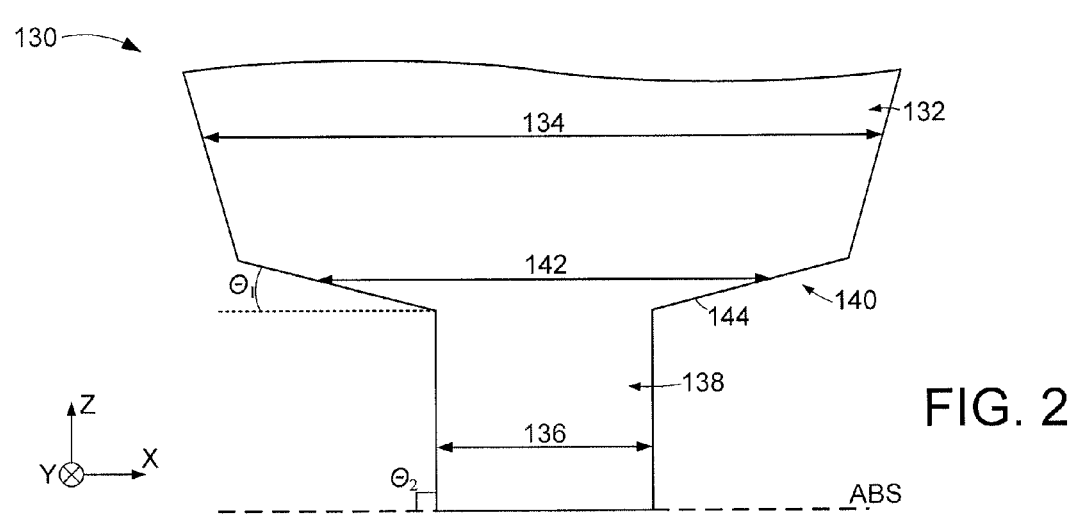
FIG. 2 illustrates a top view line representation of a portion of an example write pole capable of being used in the data storage system of FIG. 1.

FIG. 2 illustrates a top view line representation of a portion of an example write pole 130 that may be employed by the data storage system 100 of FIG. 1 in accordance with some embodiments. The write pole 130 has a body region 132 with a greater width 134 along the X axis than the width 136 of the tip region 138. It is contemplated that the write pole body 132 is configured to collect and direct magnetic flux into the tip region 138 via a taper region 140 that has a varying width 142 towards the ABS. The taper region 140 is configured to focus magnetic flux along the uniform width 136 of the tip region 138 to provide consistent supply of flux with ample effective magnetic field.

In various embodiments, the various regions of the write pole 130 are defined by a pair of matching taper regions 140 each consisting of a single linear surface 144 as part of a continuous pole sidewall, but such configuration is not required as multiple linear and/or curvilinear surfaces can be utilized for the body 132, taper 140, and tip 138 regions. With the single linear taper surface 144, the angle $\Theta_1$ with respect to the ABS and X axis can correspond with diverse operating performance that may, or may not, be conducive to high data and track density data storage environments. That is, a small change in taper angle $\Theta_1$, such as 1.5°, relative to the ABS and to the tip wall angle $\Theta_2$ can produce drastically different data writer performance metrics, like effective field gradient, magnetic footprint size, and risk of ATI. Hence, various embodiments tune $\Theta_1$ to be between 00 and 15° with respect to the ABS, such as 14.5°.

Figures 3A, 3B, 3C, 3D:
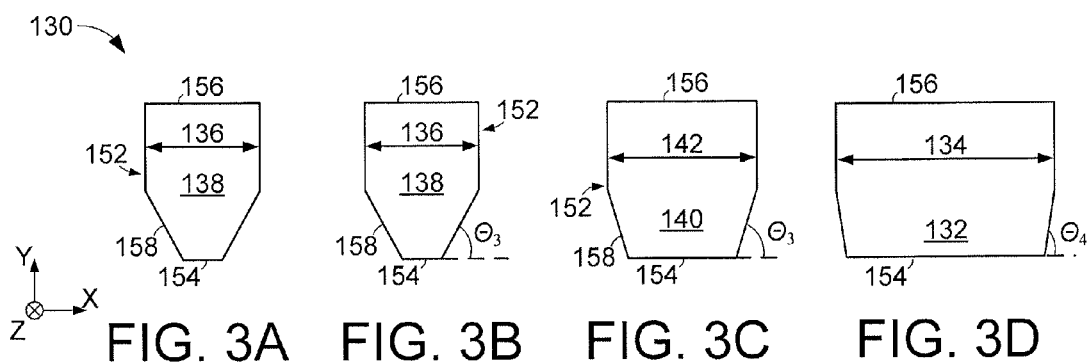
FIGS. 3A-3D respectively display ABS view line representations of portions of an example write pole configured in accordance with some embodiments.

FIGS. 3A-3D respectively display ABS view line representations of cross-sections of an example write pole 130 configured in accordance with assorted embodiments. FIG. 3A shows the write pole tip 138 at the ABS with a continuous pole sidewall 152 that is shaped to provide a trapezoidal tip shape with parallel leading 154 and trailing 156 surfaces connected by the pole sidewalls 152. Each continuous pole sidewall 152 can be configured with any number of linear and/or curvilinear surfaces, but are arranged, in some embodiments, with beveled surfaces 158 that reduce the tip width 136 towards the leading surface 156.

FIG. 3B illustrates a cross-section of the write pole tip 138 between the ABS and a pole body taper region. It is noted that the size and shape of the pole cross-sections in FIGS. 3A and 3B match due to the perpendicular orientation of the pole sidewalls 152 to the ABS throughout the write pole tip 138. That is, the write pole tip 138 and pole sidewall 152 extend from the ABS with an approximately 90° orientation that produces matching tip cross-sectional shapes and sizes throughout the write pole tip region 138 of the write pole 130. However, the perpendicular configuration of the pole sidewall 152 with respect to the ABS is not required or limiting as the tip region 138 can have varying shapes, sizes, and surface orientations along the Z axis.

In FIG. 3C, a cross-section of the taper region 140 of the write pole 130 is shown. The taper region 140 has a larger width 142 than the tip region 138 and a different bevel surface 158 angle $\Theta_3$ with respect to the X-Y plane. As evident between FIGS. 3B and 3C, the bevel surface 158 angle $\Theta_3$ increases to be more upright, which can be tuned to customize how magnetic flux is funneled to the write pole tip 138 and towards the ABS. It is contemplated that the length of the bevel surfaces 158 can also change between the write pole tip 138 and taper 140 regions to cater how magnetic flux flows through the write pole 130.

A cross-section of the write pole body 132 is shown in FIG. 3D and illustrates how width 134 is larger than widths 136 and 142 of the tip 138 and taper 140 regions, respectively. The write pole body 132 shape is defined by the continuous pole sidewalls 152 that has a larger bevel surface angle $\Theta_4$ than the taper region bevel angle $\Theta_3$ to allow greater write pole surface area and material volume to efficiently collect magnetic flux. In some embodiments, the bevel surface angle in the pole body 132 is 90° to define a rectangular pole body shape. The ability to tune the tip 138, taper 140, and body 132 regions of the write pole 130 for size and shape customizes write pole 130 performance, such as magnetic footprint size, erasure after write (EAW), and ATI metrics.

While it is understood that write pole design can optimize data writing performance for small form factors, such as nanometer scale pole dimensions, physical construction of a designed write pole can be difficult and time consuming. In other words, construction of a taper region angle $\Theta_1$ of 14.5°, a bevel surface angle $\Theta_3$ of 60°, or a pole sidewall angle $\Theta_2$ of 90° can be inconsistent when forming a write pole 130 with a tip width 136 of less than 100 nm. The use of one or more rotational milling operations can be accurate in forming a variety of write pole 130 surface angles when the write pole 130 is large, such as micron scale tip and body widths. Accordingly, various embodiments utilize a combination of rotational and static milling operations to provide precise surface dimensions and orientations despite nanometer scale write pole 130 widths, such as 50 nm or less.

Figure 4:
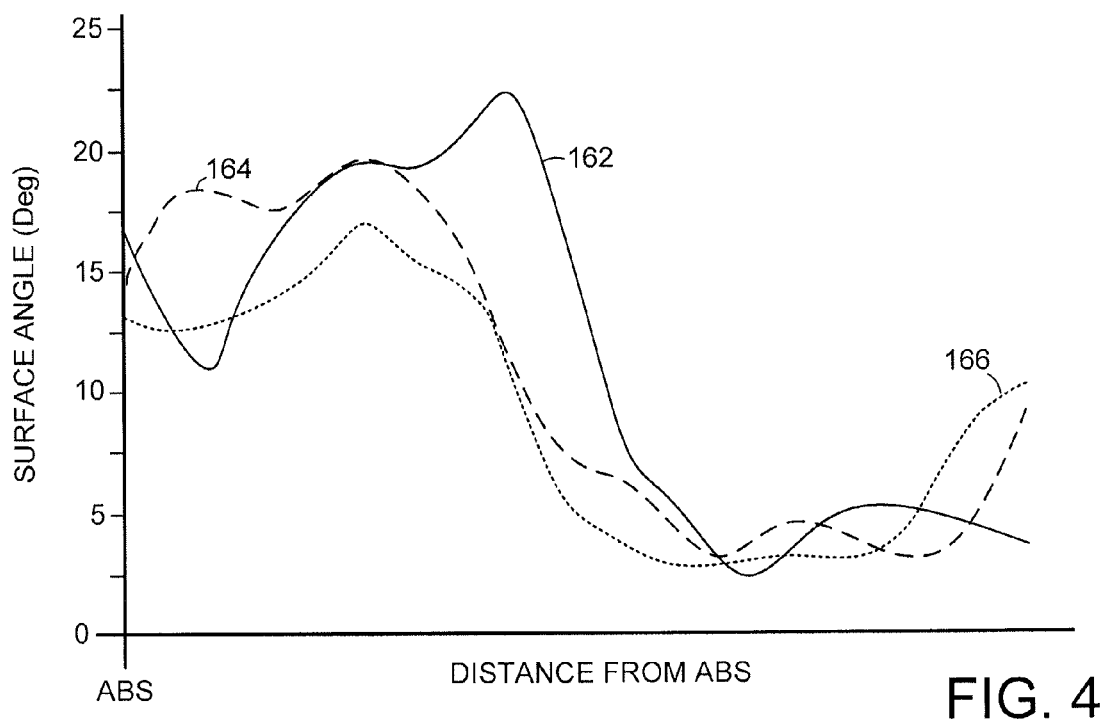
FIG. 4 plots structural data corresponding to an example write pole constructed and operated in accordance with various embodiments.

FIG. 4 plots assorted write pole surface angle variations as a product of using two static milling angles oriented with respect to a longitudinal axis of a write pole, which extends perpendicular to the ABS parallel to the Z axis. Solid line 162 displays how a static milling angles of 55° and 305° pointing towards the write pole tip can utilize shadowing effects from the write pole body to cause milling only proximal selected regions, such as the tip and/or taper regions of the write pole, to produce a drop in the taper region angle from 14.5°, as defined by segmented line 164, to approximately 0° that rises, as illustrated by segmented line 166. The point where the taper region angle changes to 0° can be characterized as a transition point, which can be tuned using different static mill angle combinations.

The variation of solid 162 and segmented 164 and 166 lines for surface angle (Y axis) corresponding to different distances from the ABS (X axis) conveys how milling is an imprecise process that provides a design surface orientation, such as a 14.5° taper angle $\Theta_1$, within acceptable tolerances. That is, the use of static milling with rotational milling can achieve precise body tip 138 and taper 140 region configurations at selected distances from the ABS, such as on the ABS or at the beginning of the body taper region, that vary within acceptable tolerances going away from the ABS towards the body 132 of the write pole.

The variation of surface angle orientation as a function of distance from the ABS can allow a write pole tip 138 and taper 140 regions to be positioned in order to achieve a design configuration. As a non-limiting example, the length of the write pole tip 138 can be tuned so that the body taper region 140 is positioned a particular distance from the ABS that is conducive to a 14.5° taper surface angle when a 55° static milling angle is employed after at least one rotational milling operation. Conversely, it is contemplated that different static milling angles can be selected to accommodate a design length of the write pole tip 138 region.

Figure 5:
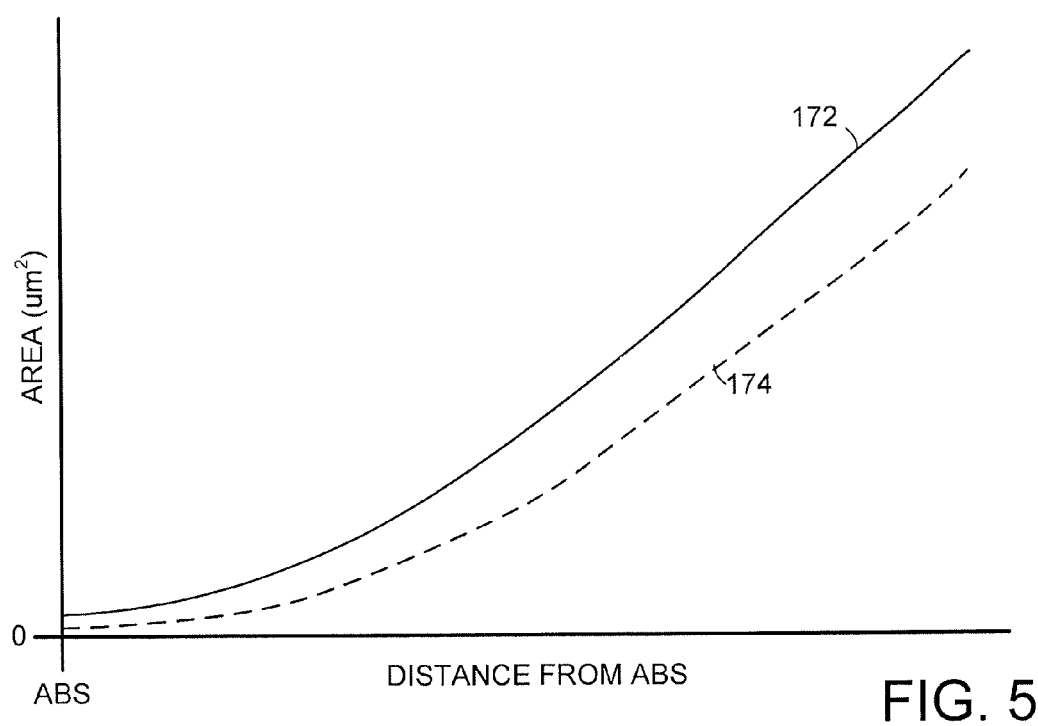
FIG. 5 graphs data for an example write pole arranged in accordance with some embodiments.
Figure 6A:
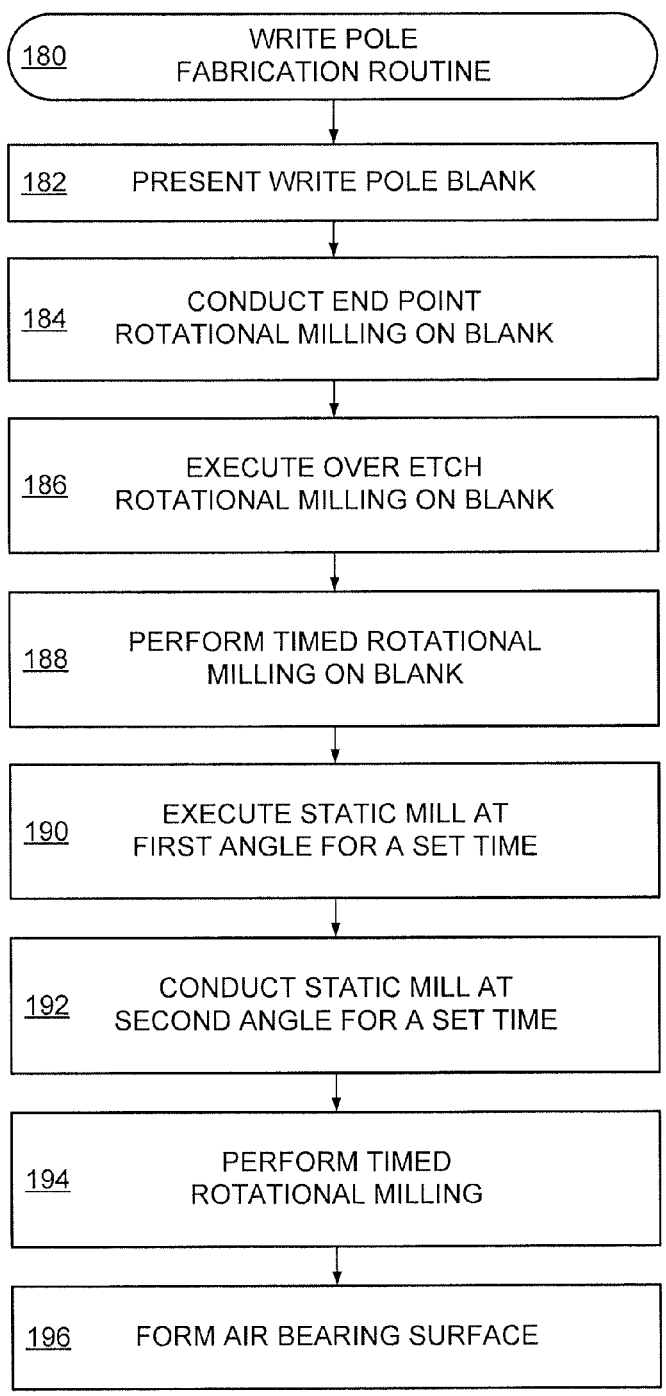
FIGS. 6A and 6B respectively provide a flowchart and associated illustrations for an example write pole fabrication routine performed in accordance with various embodiments.
Figure 6B:
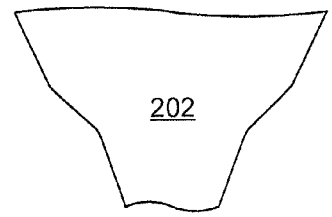
Figure 6B:
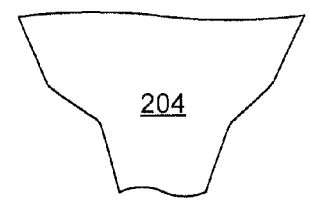
Figure 6B:
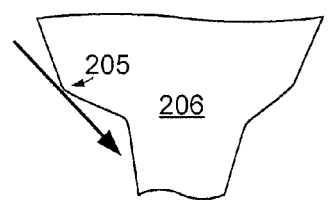
Figure 6B:
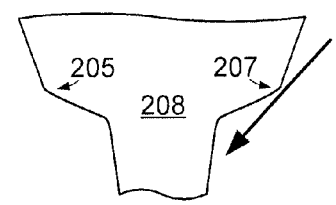
Figure 6B:
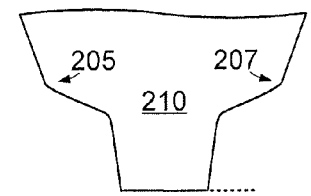

FIG. 5 graphs how the use of at least one static milling operation with one or more rotational milling operations can provide optimized write pole structural configurations. Solid line 172 corresponds with combined rotational and static milling write pole manufacturing while segmented line 174 corresponds with only rotational milling write pole construction. The increased area of solid line 172 compared to the rotational milling processes of segmented line 174 illustrates how a write pole manufactured with static and rotational milling has greater amounts of material at different positions relative to the ABS, which increases the amount of magnetic flux in the write pole body, taper, and tip regions to optimize the effective magnetic field for the write pole at the ABS.

FIG. 6 provides an example write pole fabrication routine 180 that is carried out in accordance with some embodiments to provide optimized magnetic performance with nanometer scale dimensions. Routine 180 begins by presenting a write pole blank in step 182, which corresponds with the top view line representation of blank 200. While the write pole blank can be any size and shape, it is contemplated that the blank is oversized by at least 10% of the final designed write pole configuration to allow ample material to be removed. Step 184 proceeds to conduct end point rotational milling on the write pole before step 186 executes over etch rotational milling as a continuation of step 184 to produce write pole 202. That is, steps 184 and 186 can be conducted continuously with different rotational origins.

Next, step 188 conducts a rotational mill operation on at least one portion of the write pole blank for a predetermined time, such as 1-30 seconds. The rotational milling of steps 184-188 can roughly define write pole tip 138, taper 140, and body 132 regions defined by continuous pole sidewalls, as shown by write pole 204. A first static mill operation is then executed in step 190 at a predetermined angle, such as 40-65°, for a predetermined amount of time, such as 10-15 seconds to form a first shadowing feature 205. Pole 206 illustrates how step 190 defines a first pole sidewall with approximately a 14.5° taper region angle and a 90° tip region angle with respect to the ABS.

Step 192 then removes material with a predetermined static angle for a predetermined amount of time to define a second pole sidewall opposite the first pole sidewall with a shadowing feature 207, as illustrated by write pole 208. Various embodiments configure the first and second static angles to be complementary angles, such as 55° and 305°, and the execution time to be the same, such as 12 seconds. However, non-complementary angles and different static milling times can be employed without limitation. It is contemplated that several static milling operations can be conducted on a single pole sidewall with different static angles and/or milling times. For example, two different static milling angles can be executed for different times to produce the body 132, taper 140, and tip 138 regions of a single pole sidewall.

A rotational milling operation is subsequently conducted in step 194 to further define the continuous pole sidewall configurations by utilizing the shadowing effects provided by the shadowing features 205 and 207 prior to step 196 forming an ABS surface by planarizing the write pole tip, as shown by write pole 210. Any number of additional steps can be conducted in routine 180 to incorporate the write pole into a data writer and into a transducing head that is positioned proximal a data storage medium to program data, as illustrated in FIG. 1. As such, the various steps of routine 180 are not required or limiting and steps can be added, removed, and modified without limitation.

Through the execution of rotational and static milling operations, a write pole can have small physical dimensions, such as less than a 100 nm tip width, with optimized magnetic performance due to precise pole sidewall surface orientations. The utilization of shadowing effects during static milling allows for the accurate removal of write pole material that produces write pole tip, taper, and body regions with different sidewall surface angles. With the ability to customize the shape and size of a write pole's sidewalls, the amount and behavior of magnetic flux flowing through the write pole is catered to provide greater effective magnetic field and reduced risk of erasure conditions compared to write poles with smaller body, taper, and tip regions that correspond with exclusive rotational milling pole manufacturing.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising:
    milling a write pole blank with at least one rotational milling operation;
    removing write pole blank material with a first static milling operation from a first angle with respect to an air bearing surface (ABS),
    milling the write pole blank with a second static milling operation from a second angle with respect to the ABS; and
    forming a write pole body and write pole tip from the write pole blank, the write pole tip defined by at least one continuous sidewall extending perpendicularly from the ABS to a body taper surface angled at between 0° and 15° with respect to the ABS.

2. The method of claim 1, wherein the body taper surface defines a boundary of the body of the write pole.

3. The method of claim 1, wherein the body taper surface is separated from the ABS.

4. The method of claim 1, wherein the write pole tip has a trapezoidal shape on the ABS, the trapezoidal shape comprising at least one beveled surface oriented at a bevel angle with respect to a plane extending perpendicular to the ABS.

5. The method of claim 4, wherein the bevel angle is a non-normal angle at the ABS.

6. The method of claim 4, wherein the bevel angle increases in relation to a distance from the ABS.

7. The method of claim 1, wherein the write pole body has a rectangular cross-sectional shape as measured parallel to the ABS where the write pole tip meets the write pole body.

8. The method of claim 1, wherein the write pole tip has a first width on the ABS and a greater second width distal the ABS.

9. The method of claim 8, wherein the write pole body has at least a third width, the first and second widths each being less than the third width.

10. The method of claim 1, wherein the write pole tip has a rectangular cross-sectional shape along a plane extending perpendicular to the ABS.

11. The method of claim 1, wherein the first static mill operation is conducted for 10-15 seconds.

12. The method of claim 1, wherein the second angle is 40-65° and is different than the first angle.

13. The method of claim 12, wherein the first angle is complementary to the second angle.

14. The method of claim 12, wherein the first and second static milling operations are conducted for the same amount of time.

15. The method of claim 1, wherein the ABS is formed subsequent to the second static milling operation.

16. A method comprising:
    milling a write pole blank with a first rotational milling operation;
    removing write pole blank material with a first static milling operation from a first angle with respect to an air bearing surface (ABS) to form a first shadowing feature;
    milling the write pole blank with a second static milling operation from a second angle with respect to the ABS to form a second shadowing feature; and
    performing a first rotational milling operation to employ shadowing effects from the first and second shadowing features to form a write pole body and write pole tip defined by at least one continuous sidewall extending perpendicularly from the ABS to a body taper surface angled at between 0° and 15° with respect to the ABS.

17. The method of claim 16, wherein the first shadowing feature is a transition from a first write pole body sidewall angle to a second write pole body sidewall angle.

18. The method of claim 16, wherein the second shadowing feature mirrors the first shadowing feature across a plane extending perpendicular to the ABS, the second shadowing feature being a transition from a third write pole body sidewall angle to a fourth write pole body sidewall angle.

19. The method of claim 16, wherein the first and second static milling angles are different.

* * * * *